United States Patent
Kalavai

(10) Patent No.: US 9,338,281 B2
(45) Date of Patent: *May 10, 2016

(54) METHOD AND APPARATUS FOR DETECTING AND LOCATING LOOP IMPAIRMENTS

(71) Applicant: IKANOS COMMUNICATIONS, INC., Fremont, CA (US)

(72) Inventor: Raghunath Kalavai, Bedminster, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,538

(22) Filed: Jul. 25, 2014

(65) Prior Publication Data

US 2015/0030138 A1 Jan. 29, 2015

Related U.S. Application Data

(60) Provisional application No. 61/859,548, filed on Jul. 29, 2013.

(51) Int. Cl.
| | |
|---|---|
| H04M 1/24 | (2006.01) |
| H04M 3/08 | (2006.01) |
| H04M 3/22 | (2006.01) |
| H04B 3/46 | (2015.01) |
| H04M 3/32 | (2006.01) |
| H04M 3/30 | (2006.01) |

(52) U.S. Cl.
CPC ............... *H04M 3/32* (2013.01); *H04M 3/085* (2013.01); *H04M 3/30* (2013.01)

(58) Field of Classification Search
CPC ........ H04M 3/085; H04M 3/302; H04B 3/46; H04L 27/263; H04L 27/2634
USPC ............... 379/1.01, 1.03, 1.04, 27.01, 29.01, 379/32.01, 22.01, 22.02, 22.03, 28; 375/222, 227; 324/520, 521, 527, 532, 324/534
See application file for complete search history.

(56) References Cited

U.S. PATENT DOCUMENTS

| | | | | |
|---|---|---|---|---|
| 5,864,602 | A * | 1/1999 | Needle | 379/22.02 |
| 6,292,539 | B1 * | 9/2001 | Eichen et al. | 379/1.04 |
| 6,389,109 | B1 * | 5/2002 | Schmidt et al. | 379/1.04 |
| 6,842,426 | B2 * | 1/2005 | Bogardus et al. | 370/243 |
| 9,178,668 | B2 * | 11/2015 | Kalavai | H04L 1/248 |

(Continued)

OTHER PUBLICATIONS

International Search Report issued Nov. 6, 2014 in corresponding PCT/US14/48413.

(Continued)

*Primary Examiner* — Binh Tieu
(74) *Attorney, Agent, or Firm* — Holland & Hart LLP

(57) ABSTRACT

According to certain aspects, the present invention relates to methods and apparatuses to identify and locate a line-cuts in a loop that may or may not also contain bridgetaps. In embodiments, different bands of SELT signal data are analyzed separately using a TDR method, to effectively detect any potential bridgetaps. In these and other embodiments, by combining information from the separate bands, bridgetap locations and lengths are determined. Methodology is also established to distinguish legitimate line cut or bridgetap signal data from spurious data. According to certain aspects, embodiments of the invention also incorporate baselining, which includes tests to make sure that there are no inconsistencies or imperfections that can corrupt the SELT data.

22 Claims, 12 Drawing Sheets

(56) References Cited

U.S. PATENT DOCUMENTS

| | | | |
|---|---|---|---|
| 2002/0176490 A1 | 11/2002 | Kamali et al. | |
| 2003/0001586 A1* | 1/2003 | Warke | 324/527 |
| 2006/0098725 A1 | 5/2006 | Rhee et al. | |
| 2006/0120442 A1* | 6/2006 | Melsa et al. | 375/222 |
| 2008/0205501 A1 | 8/2008 | Cioffi et al. | |
| 2008/0279269 A1* | 11/2008 | Duvaut et al. | 375/227 |
| 2009/0168973 A1 | 7/2009 | Wang et al. | |
| 2009/0268797 A1 | 10/2009 | Cunningham | |
| 2010/0086105 A1 | 4/2010 | Dinesh et al. | |
| 2011/0188640 A1 | 8/2011 | Cioffi et al. | |
| 2012/0026908 A1 | 2/2012 | Tzannes et al. | |
| 2014/0307763 A1* | 10/2014 | Eriksson et al. | 375/222 |
| 2015/0030059 A1 | 1/2015 | Kalavai | |

OTHER PUBLICATIONS

ITU-T Standard, G.993.2, Series G: Transmission Systems and Media, Digital Systems and Networks, Digital sections and digital line system—Access networks, Very high speed digital subscriber line transceivers 2 (VDSL2)—Feb. 2006; 252 pages.

ITU-T G.996.2, Series G: Transmission Systems and Media, Digital Systems and Networks, Digital sections and digital line system—Access networks, Line Testing for Digital Subscriber lines (DSL).—May 2009, 45 pages.

Carine Neus, 16th IMEKO TC4 Symposium Exploring New Frontiers of Instrumentation Methods for Electrical and Electronic Measurements Sep. 22-24, 2008, Florence, Italy, pages.

* cited by examiner

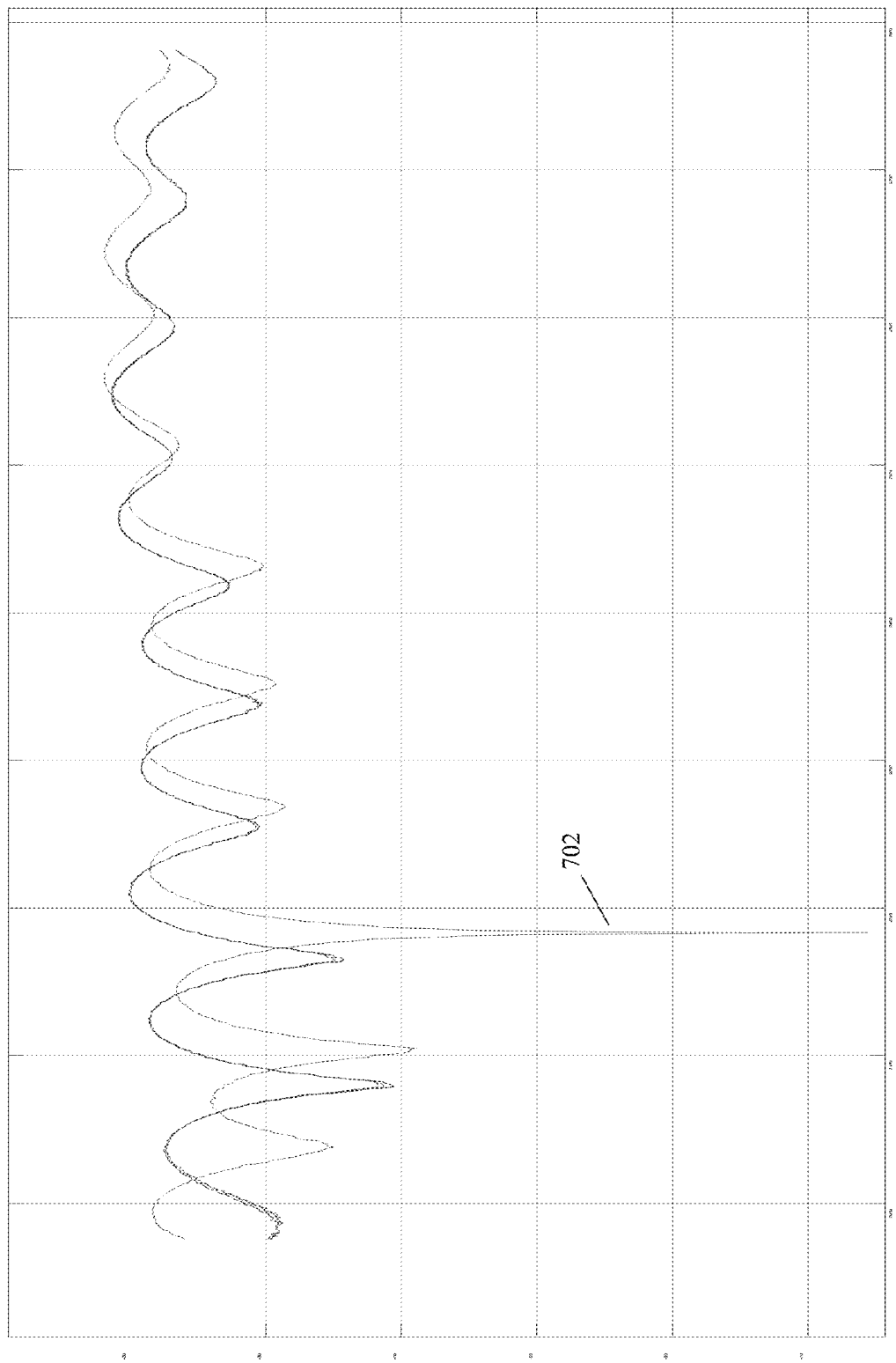

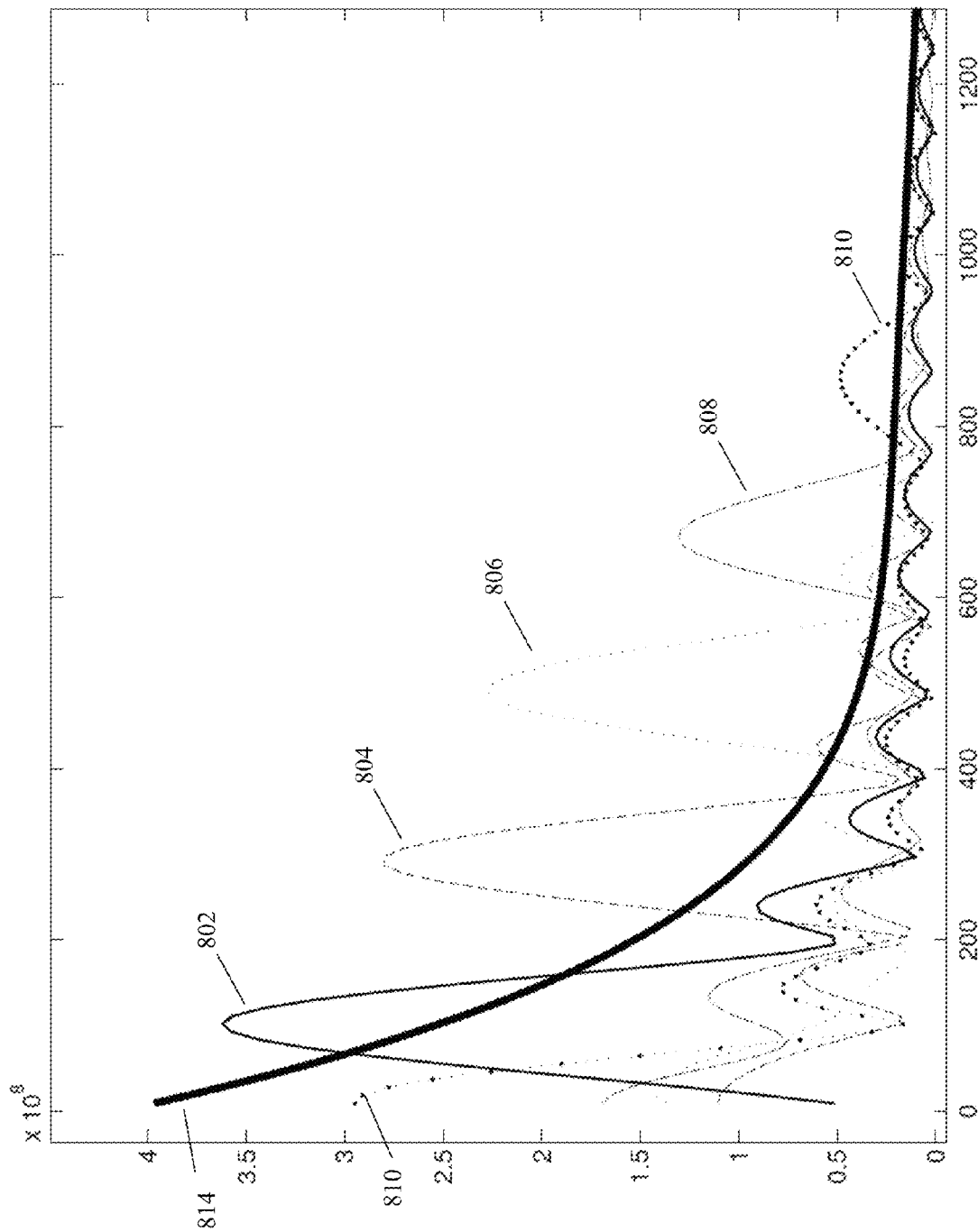

METHOD AND APPARATUS FOR DETECTING AND LOCATING LOOP IMPAIRMENTS

CROSS-REFERENCE TO RELATED APPLICATIONS

The present application claims priority to U.S. Prov. Appln. No. 61/859,548 filed Jul. 29, 2013, the contents of which are incorporated by reference herein in their entirety.

FIELD OF THE INVENTION

The present invention relates generally to xDSL communication systems, and more particularly to methods and apparatuses for locating bridge taps for loop diagnostics.

BACKGROUND OF THE RELATED ART

In single-ended line tests (i.e. SELT, see, e.g., ITU-T Standard, G.993.2, SERIES G: TRANSMISSION SYSTEMS AND MEDIA, DIGITAL SYSTEMS AND NETWORKS, Digital sections and digital line system—Access networks, Very high speed digital subscriber line transceivers 2 (VDSL2) (February 2006); ITU-T G.996.2, SERIES G: TRANSMISSION SYSTEMS AND MEDIA, DIGITAL SYSTEMS AND NETWORKS, Digital sections and digital line system—Access networks, Line Testing for Digital Subscriber lines (DSL); and "Feasibility and problems of DSL loop topology identification via single-ended line tests", Carine Neus, 16th IMEKO TC4 Symposium Exploring New Frontiers of Instrumentation and Methods for Electrical and Electronic Measurements Sep. 22-24, 2008, Florence, Italy), a known signal is sent over the loop and the reflected signal is analyzed to determine loop characteristics and any impairments present on the line.

One example of a loop impairment is a bridgetap (BT), which is an extraneous dangling cable connected to the line between a customer premises equipment (CPE) and a central office (CO) as a T or a branch. These are typically from configurations that allow the cable company to assign the same main line to different users. A BT on a line between a CO and a CPE causes impedance mismatch and signal reflections leading to a loss in bandwidth capacity on the line. BT's can be a concern to service providers since they typically do not have a historical record of BT locations. If the BT's can be detected and their location and length can be estimated then they can be removed by a technician if required. Hence it would be desirable if SELT could accurately detect bridgetaps and get an accurate loop makeup.

Breaks in a line or line-cuts are additional well-known problems for xDSL systems. These lead to a loss of connectivity and an extensive investigation to fix the problem. Accurately identifying and locating line-cuts using SELT would also be desirable.

SUMMARY OF THE INVENTION

According to certain aspects, the present invention relates to methods and apparatuses to identify and locate a line-cuts in a loop that may or may not also contain bridgetaps. In embodiments, different bands of SELT signal data are analyzed separately using a TDR method, to effectively detect any potential bridgetaps. In these and other embodiments, by combining information from the separate bands, bridgetap locations and lengths are determined. Methodology is also established to distinguish legitimate line cut or bridgetap signal data from spurious data. According to certain aspects, embodiments of the invention also incorporate baselining, which includes tests to make sure that there are no inconsistencies or imperfections that can corrupt the SELT data.

In accordance with these and other aspects, a method for examining a line coupled to a modem in a communications system according to embodiments of the invention includes receiving test signal data from the line for two or more separate frequency bands, separately converting the test signal data to at least first and second different sets of time domain data corresponding to first and second ones of the separate frequency bands, and analyzing the first and second sets of time domain data to identify impairments in the line.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 7A to 7C illustrate problems that can be found by a baselining procedure according to embodiments of the invention;

FIG. 8 shows peaks in example plots of U2 time domain data associated with straight loops having line cuts at various locations that can be analyzed by embodiments of the invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present invention relates to methods and apparatuses that accurately and reliably identify and locate line-cuts and BT's in a loop using novel analyses of test signals such as those used in SELT. According to certain other aspects, embodiments of the invention also perform novel forms of baselining, which includes tests to make sure that there are no inconsistencies or imperfections that can corrupt the test data.

Figure 1:
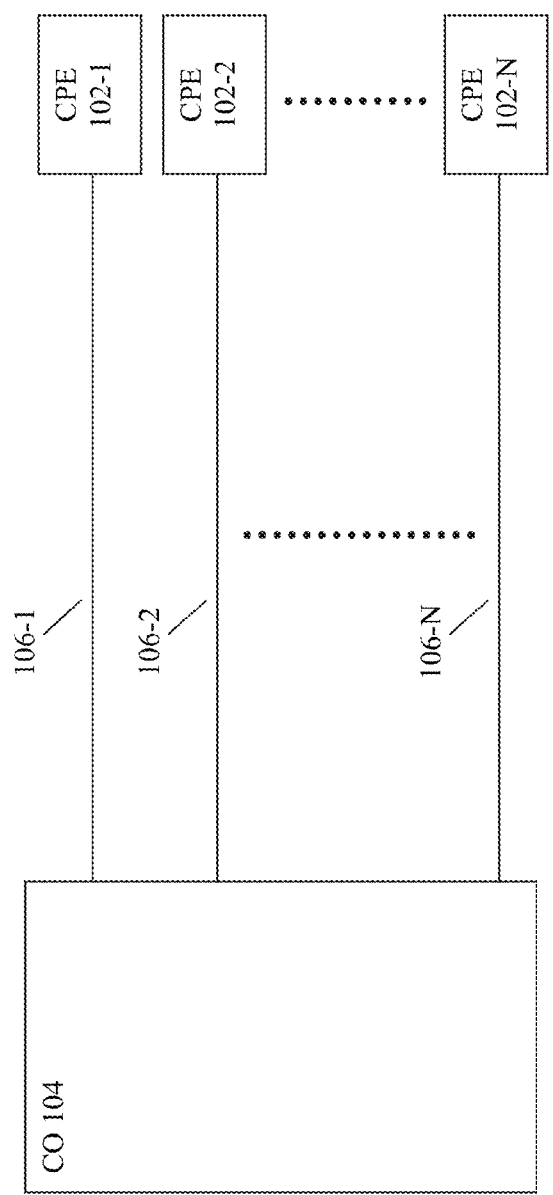
FIG. 1 is a block diagram illustrating an example system in which embodiments of the invention can be implemented.

FIG. 1 is a block diagram illustrating an example system 100 in which embodiments of the invention can be implemented. As shown in FIG. 1, a plurality of N CPE transceivers 102-1 to 102-N are coupled to a CO 104 via respective loops 106-1 to 106-N. In one non-limiting example, system 100 can be a DSL system operating according to VDSL2, in which certain or all of transceivers 102-1 to 102-N are configured as a vectoring group by CO 104. However, the invention is not limited to this example.

As set forth above, in wired communication systems (such as DSL, cable modem etc.) loop diagnostics are often based on analyses of SELT data. For example, CPE 102-1 can perform diagnostics to characterize loop 106-1 using SELT signals transmitted by CPE 102-1 on loop 106-1 and reflected back to CPE 102-1. Specifically, in an example wherein system 100 is operating according to VDSL2, a conventional SELT performed by CPE 102-1 can include continuously transmitting symbols (e.g. modulated REVERB symbols) each VDSL2 symbol period for a period of about 5 seconds to about 2 minutes, and measuring the reflections (i.e. obtaining S11 data) from loop 106-1. It should be noted that some or all of the other CPE's 102-2 to 102-N can be operating in Showtime using the same symbol periods while CPE 102-1 performs its SELT tests.

Figure 2:
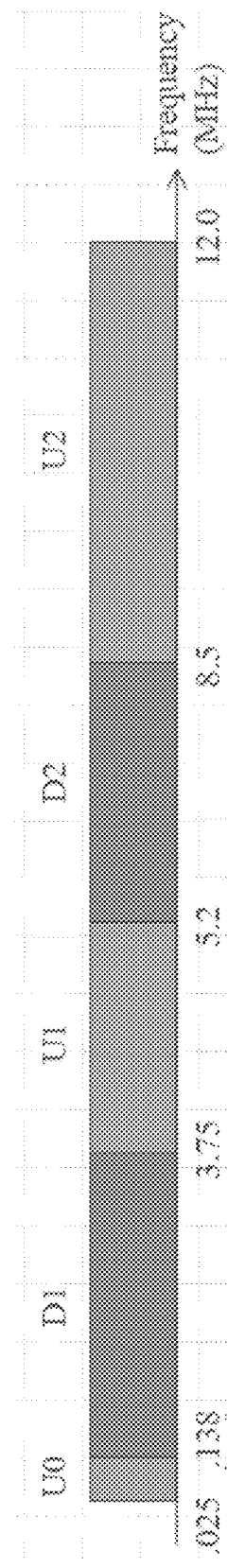
FIG. 2 is a diagram illustrating an example band plan for which SELT signals according to embodiments of the invention can be adapted.

The present inventors recognize that in conventional systems such as VDSL2, the CPE is assigned certain frequency bands in which they are permitted to transmit upstream signals according to a prescribed band plan. An example band plan such as that given in the G.993.2 standard is shown in FIG. 2. As shown, it includes three upstream bands U0 (comprising tones from 0.025 MHz to 0.138 MHz), U1 (comprising tones from 3.75 MHz to 5.2 MHz) and U2 (comprising tones from 8.5 MHz to 12.0 MHz) and two downstream bands D1 (comprising tones from 0.138 MHz to 3.75 MHz) and D2 (comprising tones from 5.2 MHz to 8.5 MHz). So symbols constructed by CPE 102-1 and used in SELT can only use tones in the upstream bands U0, U1 and U2.

As a result, conventional SELT S11 data is available only for signals using the upstream bands (e.g. U0, U1 and U2). Meanwhile, it would be desirable if SELT could be used to accurately detect the location of BT's since these can reduce the achievable data bandwidth. However, the present inventors further recognize that, due to the banded structure of the conventional SELT signal, it is difficult to detect bridgetap signatures using either frequency domain (FDR) or time domain (TDR) analyses. For example, gaps in the FDR data make it difficult to look for patterns using a FDR analysis. Likewise, discontinuities in the S11 data create artifacts in the TDR signal and clutter the signatures associated with BT's.

According to certain aspects, therefore, embodiments of the invention include methods wherein signals from one or more of the upstream bands are analyzed separately using a TDR method, to effectively detect bridgetaps. This also helps to exploit the different characteristics of the signal at different bands (for example the velocity of signal changes at different bands). Moreover, by combining information from the separately processed bands, embodiments of the invention can more accurately determine bridgetap locations and lengths, and can more accurately distinguish legitimate peaks from spurious spikes.

It should be noted that the invention is not limited to systems implementing VDSL2 and/or using bandplans such as that shown in FIG. 2. Rather, those skilled in the art will understand how to implement the invention using other systems, bandplans and/or numbers of bands after being taught by the present examples.

Figure 3:
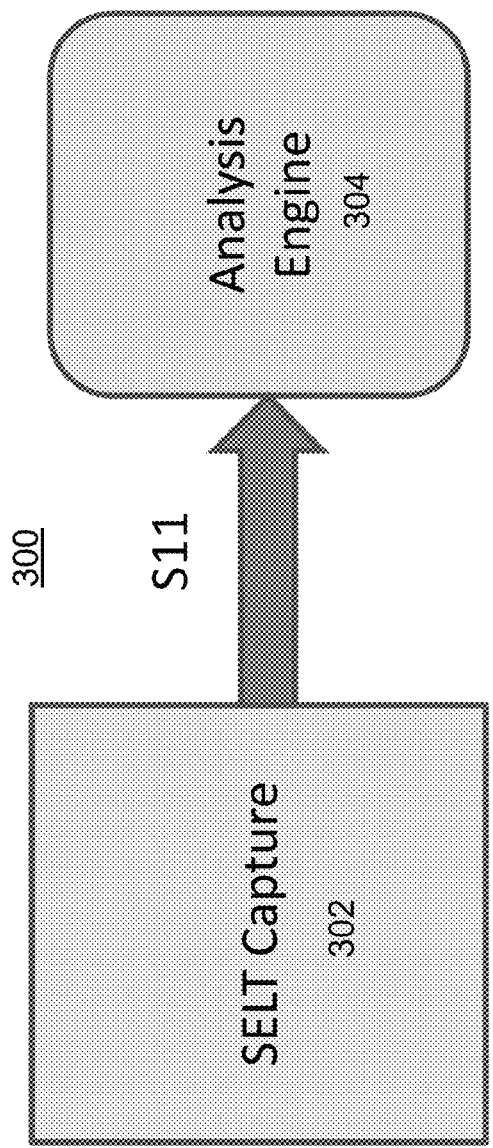
FIG. 3 is a block diagram illustrating an example loop diagnostics apparatus according to embodiments of the invention.

A block diagram illustrating an example apparatus for performing SELT according to embodiments of the invention is shown in FIG. 3. As shown, apparatus 300 includes a SELT capture block 302 and an analysis engine 304.

SELT capture block 302 includes functionality for forming SELT signals using symbols (e.g. modulated REVERB symbols) constructed from tones in one or more of the upstream band(s), transmitting the signals on the loop, measuring the reflections from the loop, and providing the S11 reflection data to analysis engine 304. SELT capture block 302 can be implemented using techniques known to those skilled in the art, and so further details thereof will be omitted here for sake of clarity of the invention.

Analysis engine 304 receives the S11 reflection data from capture block 302. In embodiments, engine 304 analyzes data from each of the upstream bands separately using a TDR method, to effectively detect bridgetaps and line-cuts in the line on which the SELT signals are transmitted and reflected by SELT capture block 302.

Figure 4:
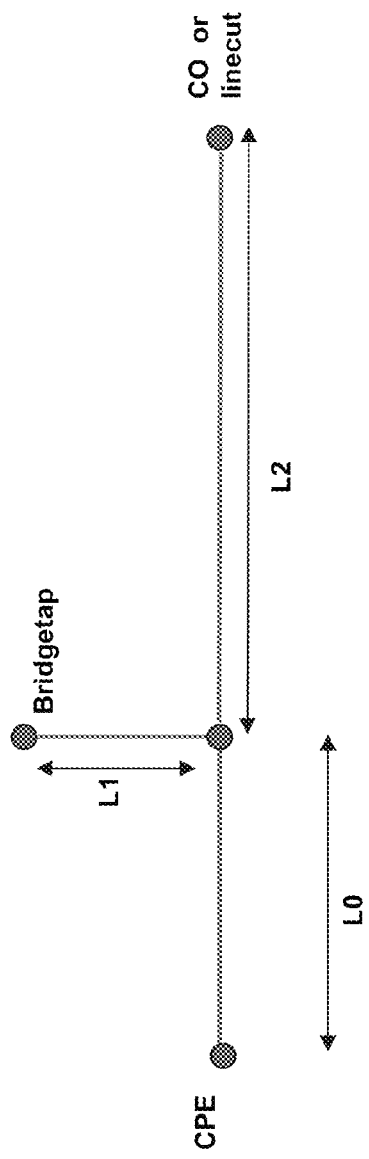
FIG. 4 is a diagram illustrating example loop characteristic values that can be identified according to embodiments of the invention.

FIG. 4 is a diagram illustrating the values obtained by analysis engine 304 according to embodiments of the invention. As shown, the values include the distance L0 from the apparatus 300 (e.g. a CPE) to a detected bridgetap, as well as its length L1. As further shown, the values also include the distance L2 between a detected bridgetap and a line-cut or the CO. It should be noted that when a bridgetap is not detected, the distance L2 is the distance between the CPE and the line-cut or CO.

Example implementation aspects of analysis engine 304 will be described in further detail below.

In embodiments, apparatus 300 is incorporated in CPE transceivers 102. In these and other embodiments, CPE transceivers 102 (as well as transceivers in CO 104) include DSL transceivers (e.g. VX180 from Ikanos Communications, Inc.) having conventional processors, chipsets, firmware, software, etc. that implement communication services such as those defined by VDSL2, ADSL2, etc. using a band plan such as that shown in FIG. 2. Moreover in these and other embodiments, apparatus 300 can be implemented by adapting SELT functionality such as that provided by diagnostics suites such as SmartCPE provided by Ikanos Communications, Inc. Those skilled in the art will be able to understand how to adapt such processors, chipsets, firmware, software, etc. to implement the SELT functionalities of the present invention after being taught by the above and following examples.

It should be noted that in alternative embodiments, apparatus 300 can be incorporated in a standalone loop diagnostics and/or monitoring device, and those skilled in the art will also be able to implement these embodiments of the invention after being taught by the present disclosure.

It should be further noted that embodiments of the invention will be described in connection with SELT performed on a downstream end of lines 106 in or near CPE transceivers 102 using upstream bands. However, the invention is not limited to this example, and such functionality can also be incorporated in or near transceivers at the CO end of lines 106 using downstream bands or upstream bands or a combination thereof.

Figure 5:
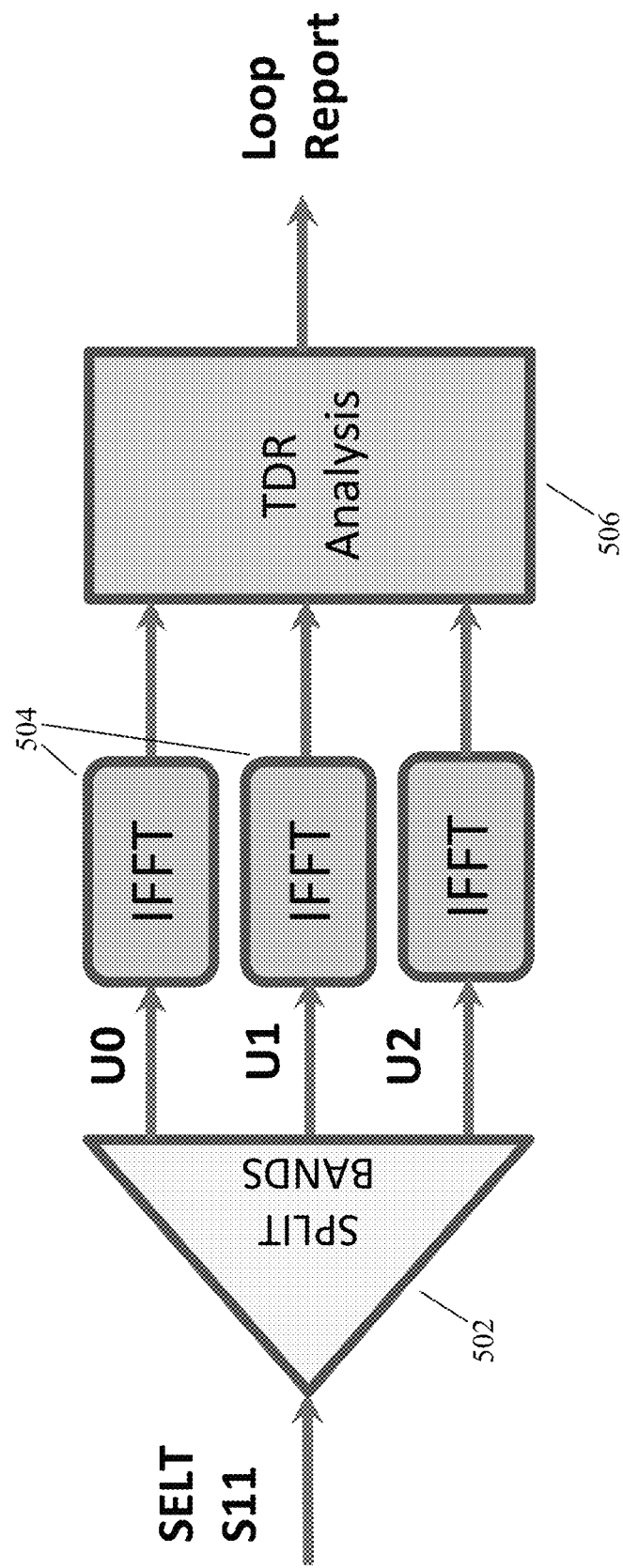
FIG. 5 is a block diagram of an example analysis engine according to embodiments of the invention.

A block diagram illustrating an example analysis engine 304 according to embodiments of the invention is shown in FIG. 5.

As shown, engine 304 receives an input SELT S11 signal, which is essentially the frequency domain representation of the measured reflected signal divided by the transmitted signal, as is well understood by those skilled in the art. This input signal is provided to band splitter 502, which includes passband filters (i.e. frequency domain windows) corresponding to each of the upstream bands used for the transmitted SELT signal. In the example where the band plan of FIG. 2 is used for the transmit signal, this includes the three upstream bands U0 (from 0.025 MHz to 0.138 MHz), U1 (from 3.75 MHz to 5.2 MHz) and U2 (from 8.5 MHz to 12.0 MHz). As set forth previously, the invention is not limited to this example.

The three frequency domain signals from bands U0, U1 and U2 are separately converted to time domain signals by IFFT's 504 and the three time domain signals are analyzed by TDR analysis block 506 to produce a loop report which can include, for example, the location and length of BT's and/or the location of line-cuts. Additional implementation features of an example engine 304 such as that shown in FIG. 5 will become even more apparent from the descriptions below in connection with the analysis methods performed by engine 304.

Figure 6:
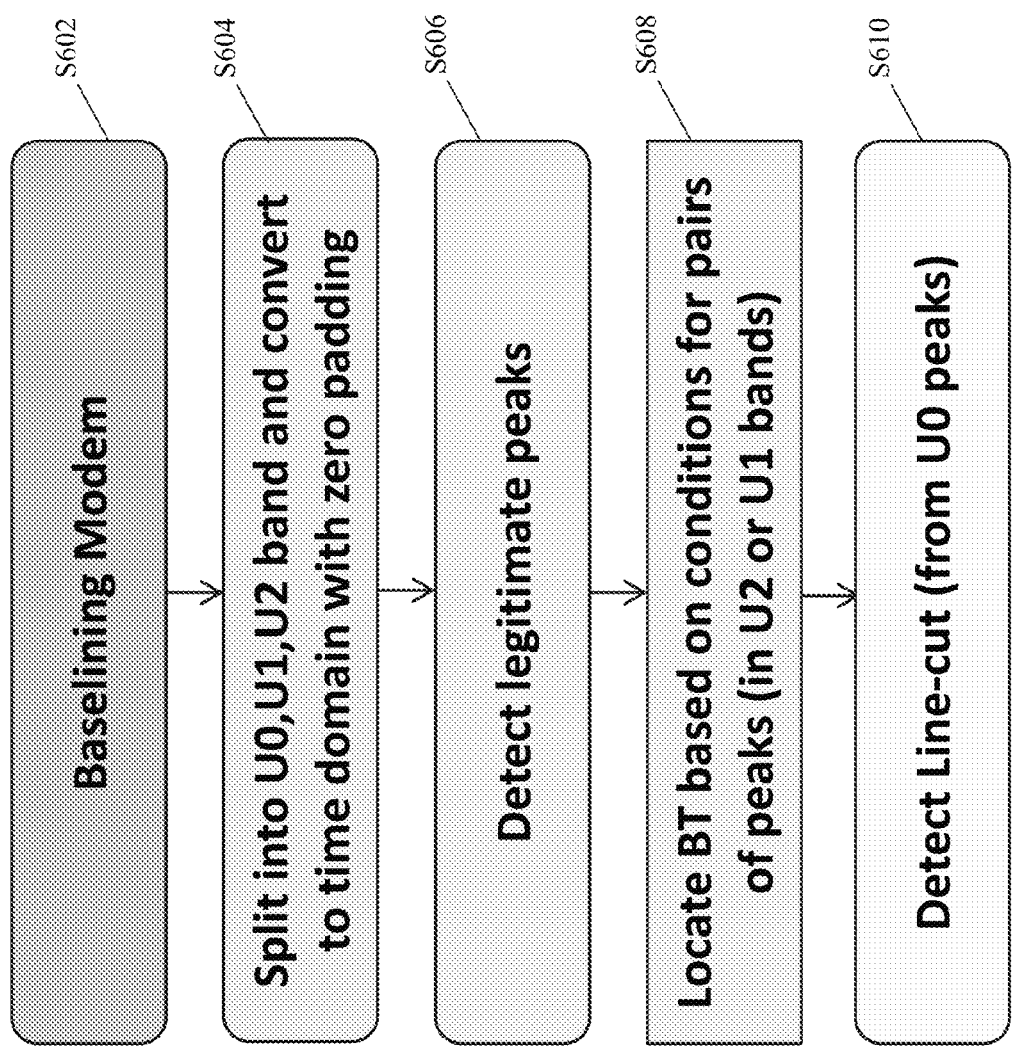
FIG. 6 is a flowchart illustrating an example methodology for identifying bridgetaps and/or line cuts according to embodiments of the invention.

An example methodology for detecting a bridgetap according to embodiments of the invention is illustrated in FIG. 6.

As shown in the example of FIG. 6, before SELT is performed the CPE modem is first checked in step S602 via a number of tests to make sure the S11 capture is accurate. This is referred to herein as baselining the modem design. These tests make sure that there are no CPE imperfections or inconsistencies that will affect the SELT data.

It should be noted that the baselining techniques of the present invention are preferably performed in addition to and before standard calibration procedures known in the art to improve the SELT signal. In fact, the present inventors recognize that a calibration procedure itself is not effective, and can even cause degradation of SELT results, without the additional use of baselining according to embodiments of the invention. For example, one version of standard calibration procedures merely aims at determining certain nominal characteristics of a modem itself that can be removed in subsequent processing after the modem is coupled to a loop. These standard procedures typically involve transmitting signals with nothing attached to the I/O ports (i.e. an "open" condition), with the I/O ports directly connected together (i.e. a "short" condition), and with a 100 ohm impedance connected between the I/O ports.

The present inventors recognize that such conventional calibration procedures are not completely effective in identifying certain problems in a modem processing chain when a modem is attached to a loop. Examples of such problems that can be identified using one or more of the baselining techniques in step S602 according to embodiments of the invention are described in more detail below.

Figure 7B:
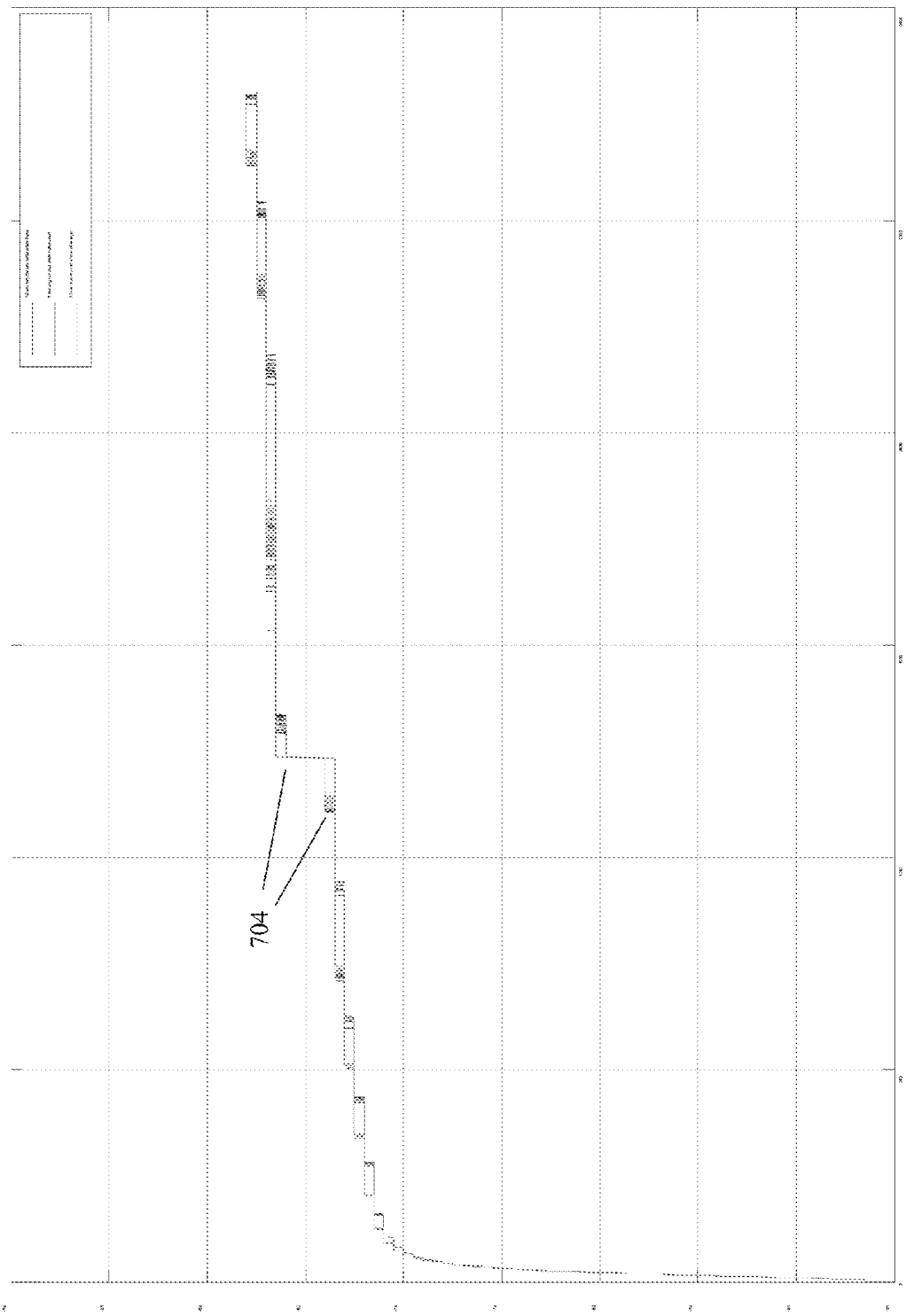

One example technique is related to capture repeatability. In other words, repeated SELT captures with the same loop should yield the same or similar data. In this technique, with the same loop, the SELT S11 signal is repeatedly measured with power cycling (i.e. power off/on after each measurement), and the measurements are compared. This test will make sure there are no inconsistencies in the Rx and Tx chain that can corrupt the data. An example of such an inconsistency is time delay variation in the Rx and Tx chain. For example, as shown in FIG. 7A, with repeated captures, the S11 data showed significant variation (e.g. spike 702 in a plot of one capture) which was later traced to slip between timing of Rx and Tx. Although this problem corrupts SELT, it may not affect the normal modem functionality. Nevertheless, such a problem should be fixed before SELT can be reliably performed.

Figure 7C:
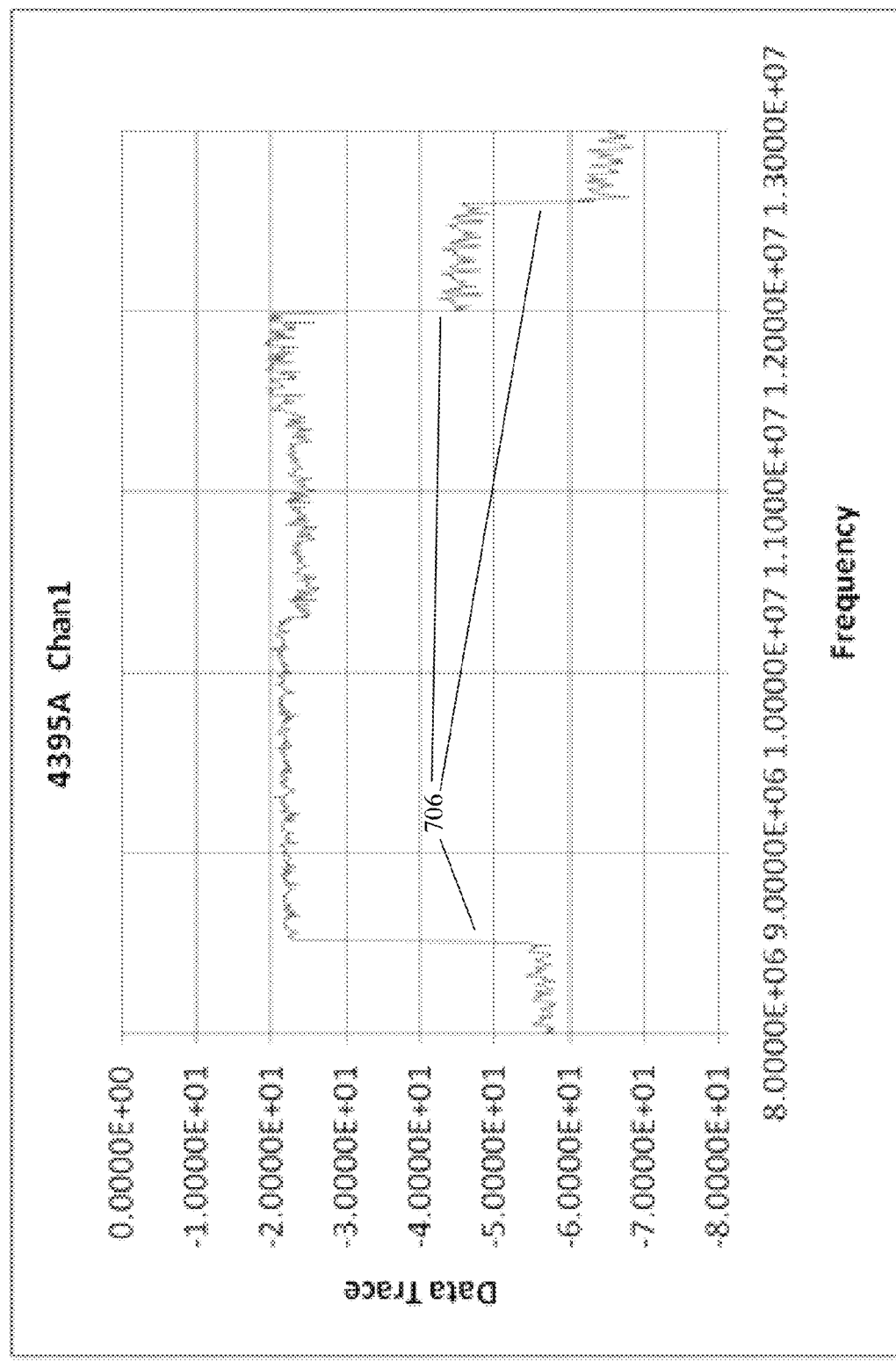

Another example baselining technique that can be performed in step S602 is to make sure that the processing in both the Rx and Tx chains are spectrally flat so that they does not introduce any modification of the SELT frequency domain data. Here the Tx and Rx transfer function characteristics are obtained by generating signals at the inputs of the processing chains and spanning the usable frequency spectrum. The outputs of the processing chains are checked using a spectrum analyzer to make sure they are substantially flat across the spectrum. In other words, there should not be any glitches in the transfer function characteristics. Examples of glitches are sudden level jumps or spikes 704 in the characteristics. In the example shown in FIG. 7B, the Rx transfer function showed a jump in level. As shown in FIG. 7C, the Tx transfer functions had multiple glitches 706.

Another example baselining technique is related to signal level consistency. In this regard, the signal gain through the Rx and Tx chains should be fixed for captures, and the AGC settings should be constant or should be accounted for during the SELT capture. This is because the signal level itself is an important signature for SELT. Accordingly, in this example technique, the captured S11 signal is assured to be independent of any changes in AGC or other signal gain in the SELT capture.

Returning to the methodology shown in FIG. 6, in the example embodiments described herein, SELT signals are transmitted from the CPE using the VDSL band such as that shown in FIG. 2, and so there is SELT S11 data captured for the three upstream bands U0, U1 and U2 by capture block 302. As shown in FIG. 5, and included in step S604, the data from the three separate bands in the frequency domain from splitter 502 are converted to time domain by using an IFFT 504 for each band separately. In embodiments, a high IFFT size is used, for example 8192 points. For each of the separate bands, bins corresponding to frequencies outside of the band are zero padded.

Next in step S606, TDR analysis block 506 analyzes the time domain signals from each of the three bands and identifies peaks that could possibly correspond to bridge taps or line-cuts. These identified peaks are further analyzed to determine whether they are legitimate peaks.

For example, FIG. 8 shows plots of U2 data (y axis is time-domain signal level and x-axis is the distance in feet) for straight loops (i.e. loops with no BT's) with a line-cut at 100 ft (i.e. plot 802), 300 ft (i.e. plot 804), 500 ft (i.e. plot 806), 700 ft. (i.e. plot 808) and 900 ft (i.e. plot 810). Note that the peaks are generally higher for line cuts closer to the CPE, with the peaks decreasing in level somewhat exponentially with increasing distance. Further note that there are spurious peaks close to the y-axis, particularly for plot 810. Accordingly, FIG. 7 also shows plot 814 that represents the peak thresholds that are used to identify legitimate peaks associated with line cuts. These thresholds can be determined empirically or theoretically with models, as will be appreciated by those skilled in the art.

In a next step S608, bridgetaps are located using the peaks identified in step S608. In example embodiments, a bridgetap typically will give rise to two significant peaks in the time domain signal (i.e. TDR signal), one at the location of the bridgetap (i.e. at length L0 shown in FIG. 4), and one at the end of bridgetap (i.e. at length L0+L1 shown in FIG. 4).

Figure 9:
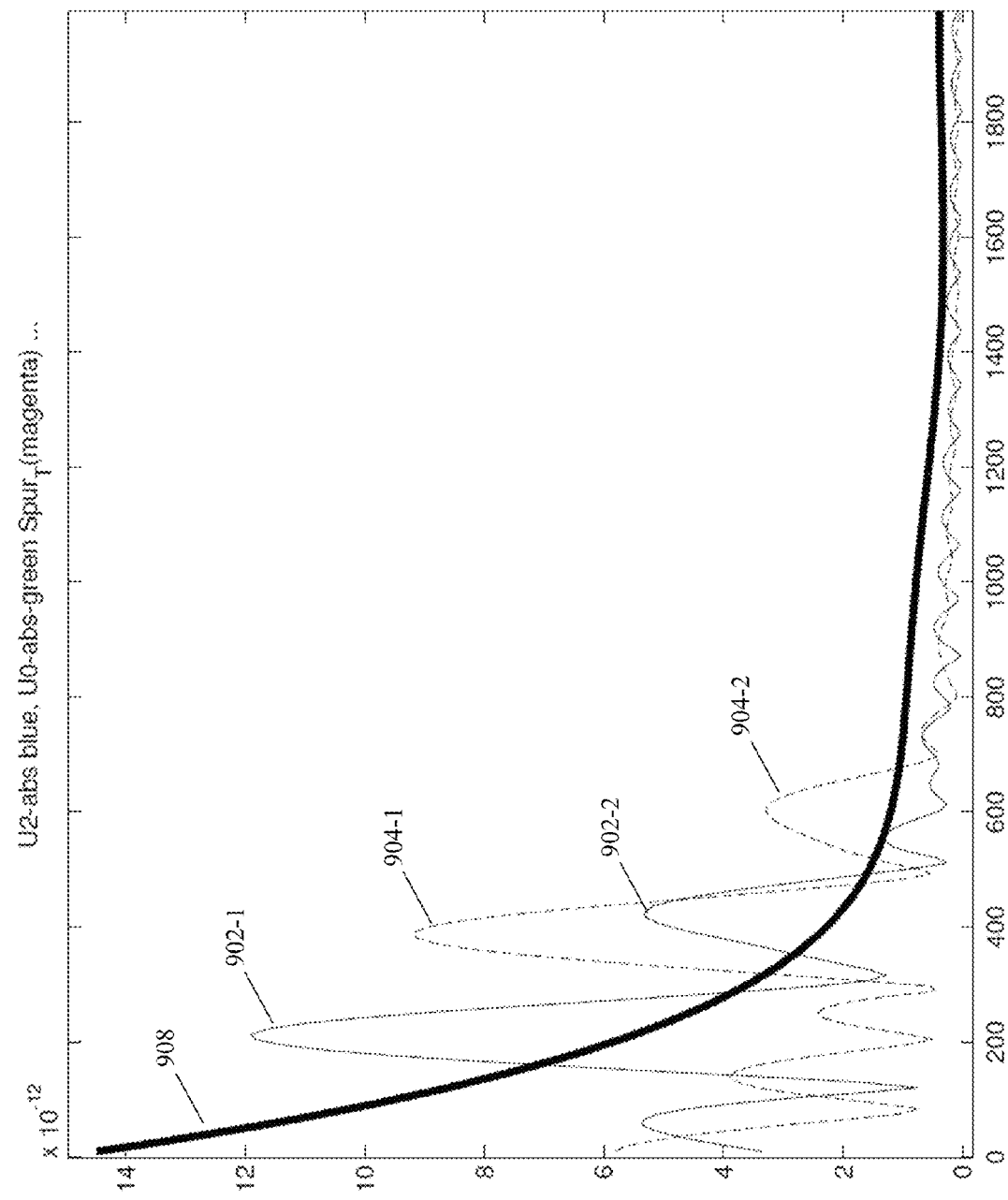
FIG. 9 shows peaks in example plots of U2 time domain data associated with loops having bridgetaps at various locations that can be analyzed by embodiments of the invention.

For example, FIG. 9 shows plots of U2 data (y axis is time-domain level and x-axis is the distance in feet) for two loops, one with a 200 ft bridgetap located at 200 ft (i.e. peaks 902-1 and 902-2) and one with a 200 ft bridgetap located at 400 ft (i.e. peaks 904-1 and 904-2). There is a final loop section L2 of 1100 ft in both loops. Similar to the data in FIG. 9, note that the peaks are generally higher for bridgetaps closer to the CPE, with the peaks decreasing in level somewhat exponentially with increasing distance. As such plot 908 is shown, wherein with increasing distance the peak threshold for determining legitimate peaks declines somewhat exponentially.

Figure 10:
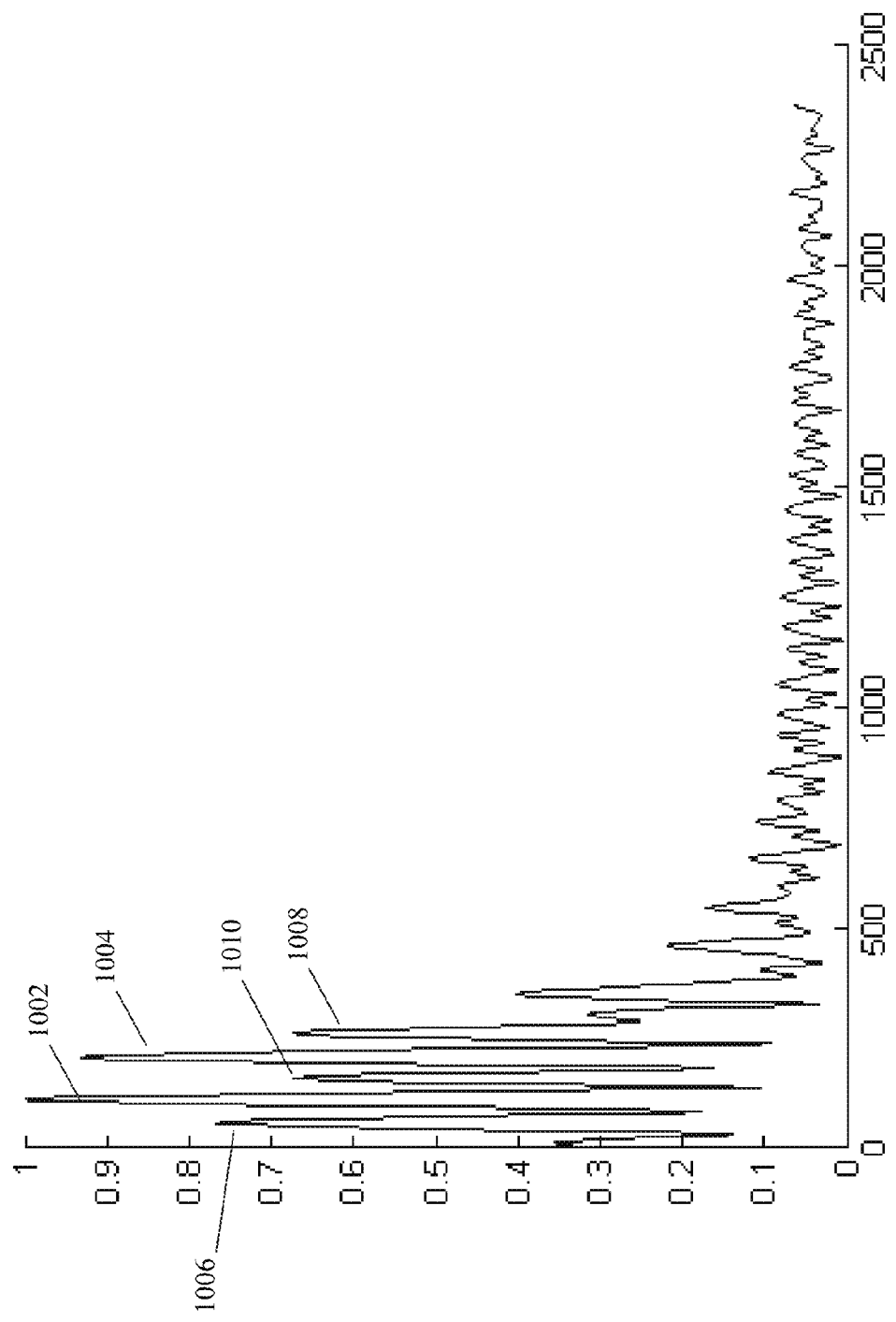
FIG. 10 illustrates an example composite signal that is used in conventional SELT analysis.
Figure 11:
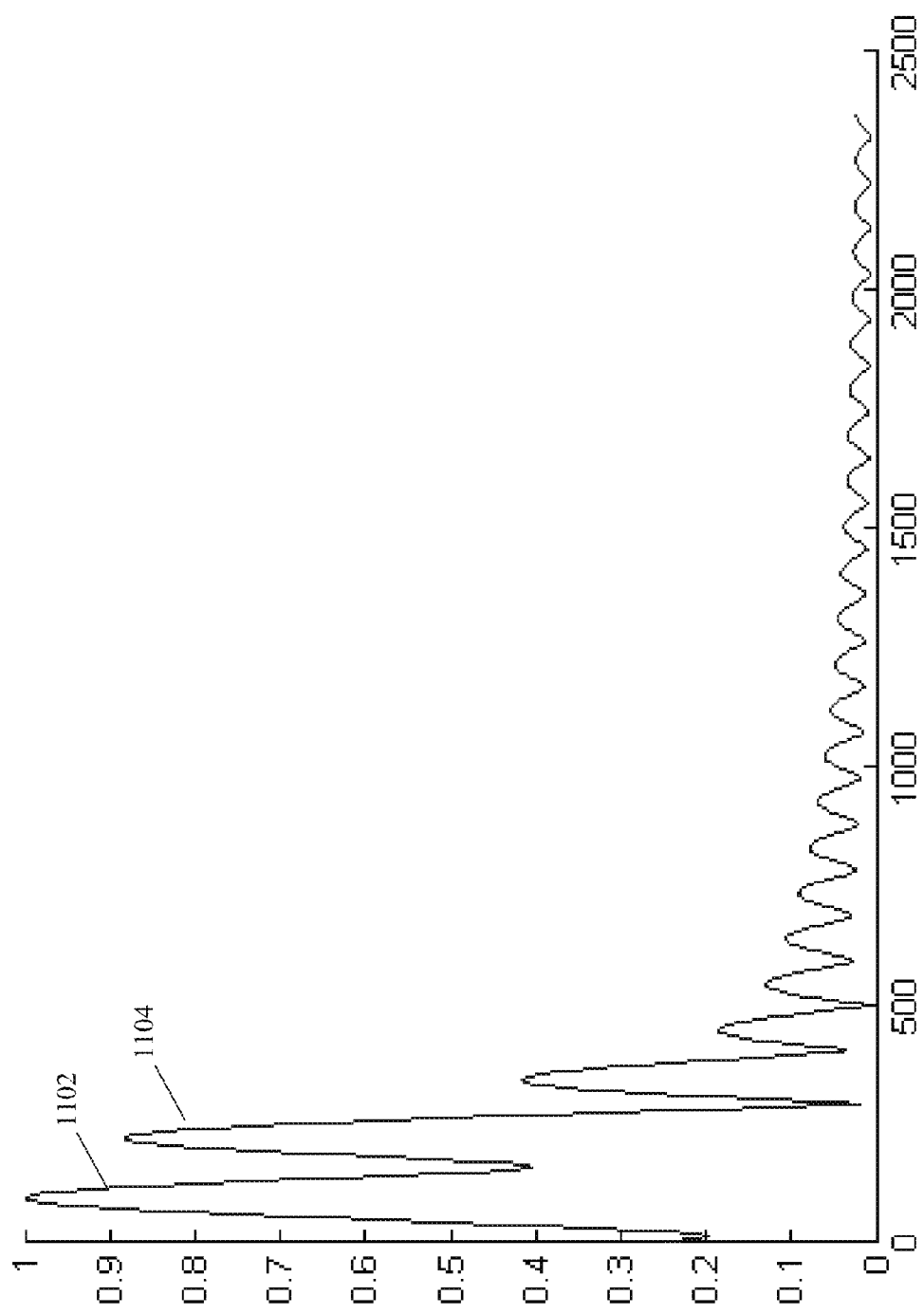
FIG. 11 illustrates an example signal corresponding to the signal in FIG. 10 but for the U2 band only according to aspects of the invention.

An advantage of the multiband analysis approach according to the invention is clearly demonstrated by comparing FIGS. 10 and 11, which are both plots for a loop having a BT 100 ft BT at 100 ft location, and a total loop length of 1600 ft. FIG. 10 illustrates a TDR composite signal according to the prior art, which includes data for all three bands U0, U1, U2. In comparison, FIG. 11 illustrates a TDR signal for the U2 band only. As can be seen, the TDR plot of the U2 band signal in FIG. 11 clearly shows two dominant peaks 1102 and 1104. Meanwhile, the composite signal plot shown in FIG. 10 also has two dominant peaks 1002 and 1004 but these peaks are now corrupted by strong spurious peaks 1006, 1008 and 1010, making it more difficult to determine the number, location and/or lengths of any bridge taps.

It should be noted that there can also be spurious peaks even in the single-banded signals according to the invention such as those shown in FIG. 9 and FIG. 11. Accordingly, as set forth above in connection with step S606, a threshold curve level is determined to separate out real peaks from spurious peaks. The threshold curve level is chosen as the lowest peak level that is obtained due to the presence of a bridgetap or for a line-cut for a given distance.

Moreover, processing in step S608 preferably includes additional functionality for declaring whether legitimate peaks are actually associated with bridgetaps. For example, if two or more legitimate peaks are identified in step S606, it is initially determined that a bridgetap may be present. Next the peaks of the closest pairs of peaks are compared to peak level ratio thresholds that have been pre-determined, for example by empirical tests. This process of comparing pairs repeats until a pair of legitimate peaks satisfies the threshold ratio conditions for a bridgetap. If any such pair is found, the two peaks are declared as denoting the presence of a bridgetap.

Once the location of bridgetaps based on the time-domain samples, a mapping curve is developed between the location of the sample in the time domain and distance in feet (for each of U1 and U2 bands). This mapping can be done using conventional benchmarking with known loops in the lab, and programmed into or otherwise provided to the CPE. Applying this mapping to the locations of the identified pair of peaks in the time domain gives the location and length of the bridgetap.

It should be noted that the processing for steps S606 and S608 can be separately performed for different bands, and the results combined or compared for accuracy. For example, data from the U2 band is generally effective in detecting bridgetaps at shorter lengths (e.g. located below 800 ft), while data the U1 band can detect bridgetaps further away.

As mentioned above, breaks in the cable or line-cut are a well-known problem for DSL systems. This leads to loss of connectivity and an extensive investigation to fix the problem. Accordingly, a next step S610 shown in the example methodology of FIG. 6 is preferably performed.

Figure 12:
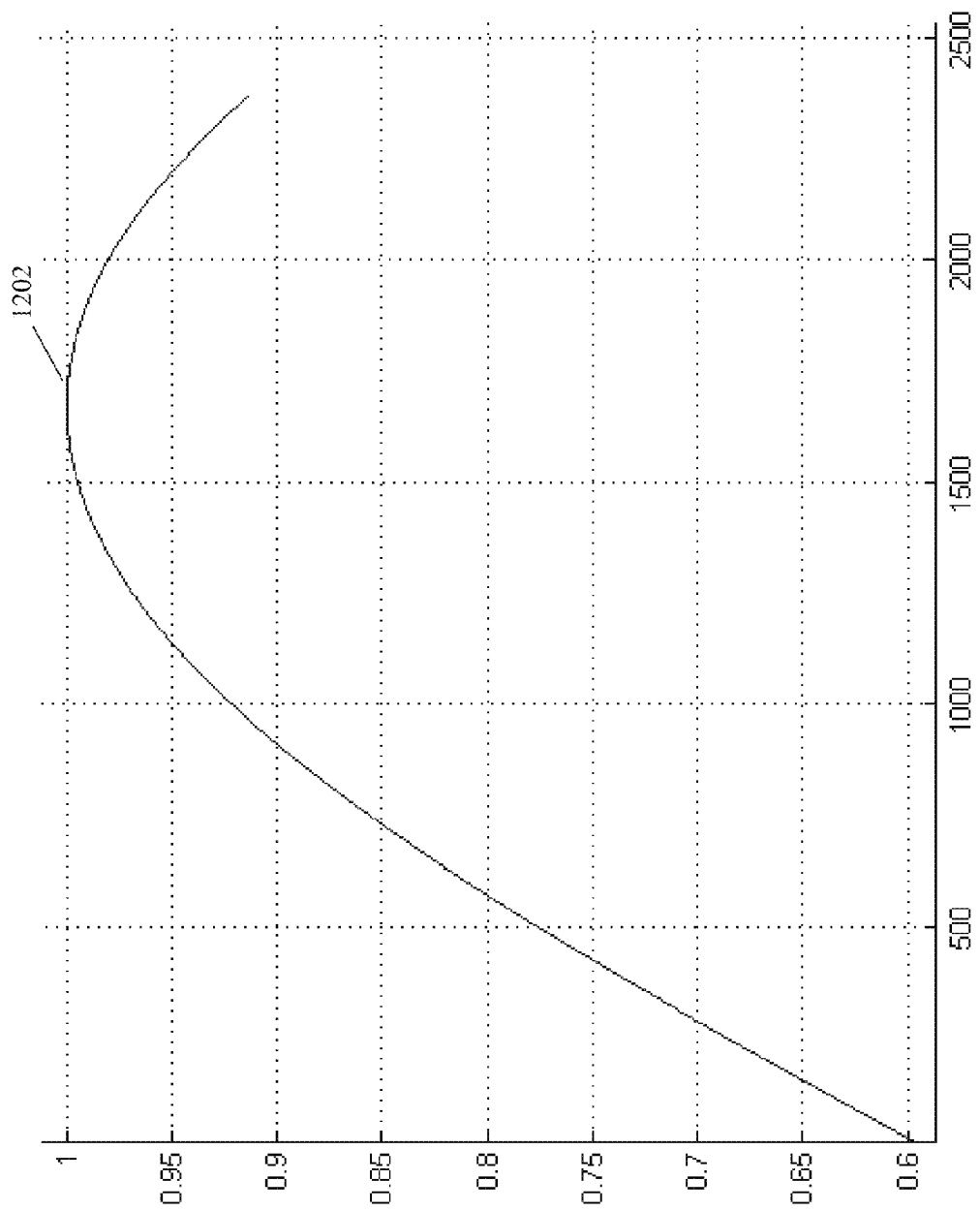
FIG. 12 illustrates an example signal for U0 band data only for a loop having a 100 ft BT at 100 ft location, and a total loop of 1600 ft.

The present inventors recognize that given that the U0 band is a low frequency band, based on the properties of the signal transmission it is minimally impacted by the presence BTs. FIG. 12 illustrates a plot of TDR data for the U0 band only and for a loop having a 100 ft BT at 100 ft location, with a total loop length of 1600 ft, similar to the loops used in FIGS. 10 and 11. Note that the U0 signal of FIG. 12 shows a clear single peak 1202 for line-cut at 1600 ft. Meanwhile, in the composite TDR signal of FIG. 10, there is no peak at all for the 1600 ft. line-cut. Thus a peak in data for the U0 band only effectively identifies the presence of a line-cut. It should be further noted from FIG. 12 that BTs do not register peaks in the U0 data at all.

Accordingly, given the fact that the lower frequencies can travel longer distance with less attenuation, the U0 band is preferably used in step S610 according to embodiments of the invention to detect line-cuts which can also be at long distances. For example, the full loop-length (L0+L2) is determined from the peak 1202 in the U0 band (as shown in FIG. 12). A separate mapping curve is developed between the peak position and the distance in feet for the U0 band. This gives the location of the line-cut in feet.

It should be noted that embodiments of the invention can be practiced together with the SELT functionalities described in co-pending application No. 14/341,576, the contents of which are incorporated herein in their entirety.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, implemented by a computer processor, for examining a line coupled to a modem in a communications system, comprising:
    receiving test signal data from the line for two or more separate frequency bands;
    separately converting the test signal data to at least first and second different sets of time domain data corresponding to first and second ones of the separate frequency bands; and
    analyzing, using the computer processor, the first and second sets of time domain data to identify impairments in the line.

2. The method according to claim 1, wherein the test signal data comprises frequency domain S11 data.

3. The method according to claim 1, wherein the impairment is a bridgetap, and analyzing includes determining one or both of a location relative to the modem and length of the bridgetap.

4. The method according to claim 1, wherein the impairment is a line cut, and analyzing includes determining a location relative to the modem of the line cut.

5. The method according to claim 1, wherein analyzing includes identifying peaks in one or both of the first and second different sets of time domain data.

6. The method according to claim 5, wherein analyzing further includes comparing identified peaks to a threshold, and declaring identified peaks exceeding the threshold as legitimate peaks.

7. The method according to claim 5, wherein the first one of the separate frequency bands is higher in frequency than the second one of the separate frequency bands, and wherein the identified peaks in the first set of time domain data are used to detect a bridgetap in the line.

8. The method according to claim 7, wherein analyzing includes analyzing a pair of identified peaks to determine a length of the detected bridgetap.

9. The method according to claim 5, wherein the first one of the separate frequency bands is lower in frequency than the second one of the separate frequency bands, and wherein the identified peaks in the first set of time domain data are used to detect a cut in the line.

10. The method according to claim 1, further comprising, before receiving the test signal data, baselining the modem.

11. The method according to claim 10, wherein baselining includes repeatedly capturing test signal data with power cycling to determine capture repeatability.

12. The method according to claim 10, wherein baselining includes obtaining transfer function characteristics of one or both of a transmit and receive processing chains of the modem and determining whether the characteristics are spectrally flat across a usable frequency spectrum.

13. The method according to claim 10, wherein baselining includes determining a signal level consistency of the modem.

14. The method according to claim 1, wherein the modem is a CPE modem and the first and second separate frequency bands are separate first and second upstream bands in a xDSL system frequency band plan.

15. The method according to claim 14, wherein the test signal data is associated with symbols constructed using tones in only the first and second upstream bands.

16. An apparatus for examining a line coupled to a modem in a communications system, comprising:
    a capture block that receives test signal data from the line for two or more separate frequency bands;
    first and second Inverse Fast Fourier Transforms (IFFTs) that respectively convert the test signal data to at least first and second different sets of time domain data corresponding to first and second ones of the separate frequency bands; and
    a Time Domain Reflectometry analysis engine that analyzes the first and second time domain data to identify impairments in the line.

17. The apparatus according to claim 16, wherein the test signal data comprises frequency domain S11 data.

18. The apparatus according to claim 16, wherein the first one of the separate frequency bands is higher in frequency than the second one of the separate frequency bands, and wherein identified peaks in the first set of time domain data are used to detect a bridgetap in the line.

19. The apparatus according to claim 16, wherein the first one of the separate frequency bands is lower in frequency than the second one of the separate frequency bands, and wherein identified peaks in the first set of time domain data are used to detect a cut in the line.

20. The apparatus according to claim 16, wherein the modem is a CPE modem and the first and second separate frequency bands are separate first and second upstream bands in a xDSL system frequency band plan.

21. The method according to claim 1, wherein separately converting includes splitting the received test signal into frequency domain data corresponding to first and second ones of the separate frequency bands.

22. The apparatus according to claim 16, further comprising a band splitter that splits the received test signal into frequency domain data corresponding to first and second ones of the separate frequency bands before the test signal data is respectively converted by the first and second IFFTs.

* * * * *